US012451616B2

(12) United States Patent
Cheng

(10) Patent No.: US 12,451,616 B2
(45) Date of Patent: Oct. 21, 2025

(54) ANTENNA SYSTEM AND ANTENNA ARRAY

(71) Applicant: Wistron NeWeb Corp., Hsinchu (TW)

(72) Inventor: Chia-Shang Cheng, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 251 days.

(21) Appl. No.: 18/320,410

(22) Filed: May 19, 2023

(65) Prior Publication Data

US 2024/0039170 A1 Feb. 1, 2024

(30) Foreign Application Priority Data

Jul. 26, 2022 (TW) .................................. 111127883

(51) Int. Cl.
*H01Q 21/06* (2006.01)
*H01Q 5/371* (2015.01)

(52) U.S. Cl.
CPC ........... *H01Q 21/065* (2013.01); *H01Q 5/371* (2015.01)

(58) Field of Classification Search
CPC ......... H01Q 3/26; H01Q 5/371; H01Q 21/065
See application file for complete search history.

(56) References Cited

U.S. PATENT DOCUMENTS 5,872,547 A * 2/1999 Martek .................. H01Q 11/08 343/893

FOREIGN PATENT DOCUMENTS

TW 202026660 A 7/2020
TW 202105837 A 2/2021

* cited by examiner

*Primary Examiner* — Graham P Smith
(74) *Attorney, Agent, or Firm* — McClure, Qualey & Rodack, LLP

(57) ABSTRACT

An antenna system includes an antenna array and a floating metal element. The antenna array includes a plurality of antenna units. The floating metal element is adjacent to the antenna array. A coupling distance is formed between the floating metal element and the antenna array. The floating metal element is configured to suppress the side lobe radiation of the antenna array.

18 Claims, 9 Drawing Sheets

ANTENNA SYSTEM AND ANTENNA ARRAY

CROSS REFERENCE TO RELATED APPLICATIONS

This application claims priority of Taiwan Patent Application No. 111127883 filed on Jul. 26, 2022, the entirety of which is incorporated by reference herein.

BACKGROUND OF THE INVENTION

Field of the Invention

The disclosure generally relates to an antenna system, and more particularly, to an antenna system for suppressing side lobe radiation.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has too high side lobe radiation, it will degrade the communication quality of the relative mobile device. Accordingly, it has become a critical challenge for antenna designers to design a small-size antenna system with relatively low side lobe radiation.

BRIEF SUMMARY OF THE INVENTION

In an exemplary embodiment, the invention is directed to an antenna system that includes an antenna array and a floating metal element. The antenna array includes a plurality of antenna units. The floating metal element is adjacent to the antenna array. A coupling distance is formed between the floating metal element and the antenna array. The floating metal element is configured to suppress the side lobe radiation of the antenna array.

In some embodiments, the antenna units are divided into a central group, an edge group, and a corner group. The central group corresponds to relatively large RF (Radio Frequency) power. The edge group corresponds to relatively median RF power. The corner group corresponds to relatively small RF power.

In some embodiments, the antenna units are divided into a first group, a second group, a third group, and a fourth group. The first group corresponds to the original feeding phase. The second group corresponds to a first delay feeding phase. The third group corresponds to a second delay feeding phase. The fourth group corresponds to a third delay feeding phase.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
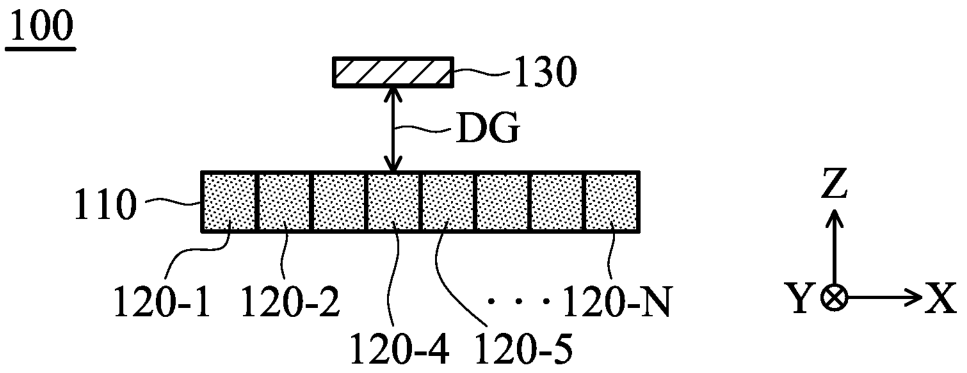
FIG. 1 is a side view of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a side view of an antenna system 100 according to an embodiment of the invention. For example, the antenna system 100 may be applied in a detection device, a wireless access point, or a high-way ETC (Electronic Toll Collection) system, but it is not limited thereto. In the embodiment of FIG. 1, the antenna system 100 includes an antenna array 110 and a floating metal element 130. The antenna array 110 includes a plurality of antenna units 120-1, 120-2, . . . , and 120-N (N is a positive integer which is greater than or equal to 4). The antenna units 120-1, 120-2, . . . , and 120-N may all be made of metal materials, such as copper, silver, aluminum, iron, or their alloys.

The shapes and types of the antenna units 120-1, 120-2, . . . , and 120-N are not limited in the invention. For example, any of the antenna units 120-1, 120-2, . . . , and 120-N may be a patch antenna, a monopole antenna, a dipole antenna, a loop antenna, a PIFA (Planar Inverted F Antenna), or a hybrid antenna.

The floating metal element 130 is disposed adjacent to the antenna array 110. The floating metal element 130 is completely separate from the antenna array 110. A coupling distance DG is formed between the floating metal element 130 and the antenna array 110. It should be noted that the term "adjacent" or "close" in the disclosure means that the distance (spacing) between two corresponding elements is smaller than the predetermined distance (e.g., 10 mm or the shorter), but it often does not mean that the two corresponding elements directly touch each other (i.e., the aforementioned distance or space between them is reduced to 0). According to practical measurements, the floating metal element 130 is configured to suppress any side lobe radiation of the antenna array 110. In some embodiments, the antenna system 100 further includes a nonconductive housing (not shown), and the floating metal element 130 is disposed on the inner side of the nonconductive housing. In some embodiments, the floating metal element 130 is adjacent to the center of the antenna array 110. For example, if the antenna array 110 is a 1D (One-dimensional) antenna array, the floating metal element 130 may be disposed between the antenna units 120-4 and 120-5 adjacent to the center of the antenna array 110, but its actual position is adjustable according to different requirements.

Figure 2:
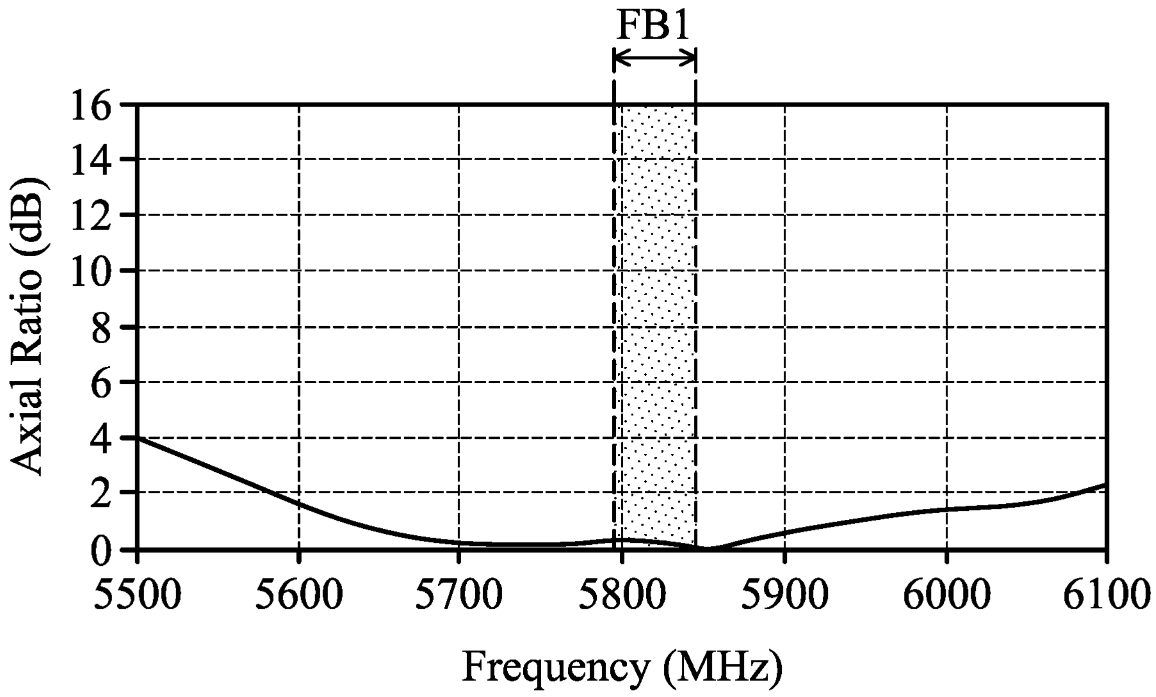
FIG. 2 is a diagram of an axial ratio of an antenna system according to an embodiment of the invention.

FIG. 2 is a diagram of the axial ratio of the antenna system 100 according to an embodiment of the invention. The horizontal axis represents the operational frequency (MHz), and the vertical axis represents the axial ratio (dB). According to the measurement of FIG. 2, the antenna array 110 supporting circular polarization can cover at least an operational frequency band FB1 from 5795 MHz to 5845 MHz. To optimize the coupling effect, the coupling distance DG between the floating metal element 130 and the antenna array 110 may be shorter than or equal to 0.5 wavelength (k/2) of the operational frequency band FB1. For example, the coupling distance DG may be about 3 mm, but it is not limited thereto. Accordingly, the antenna system 100 can cover at least the wideband operations of vehicle transmission and WLAN (Wireless Local Area Network) 5 GHz.

The following embodiments will introduce different configurations and detailed structural features of the antenna system 100. It should be understood that these figures and descriptions are merely exemplary, rather than limitations of the invention.

Figure 3A:
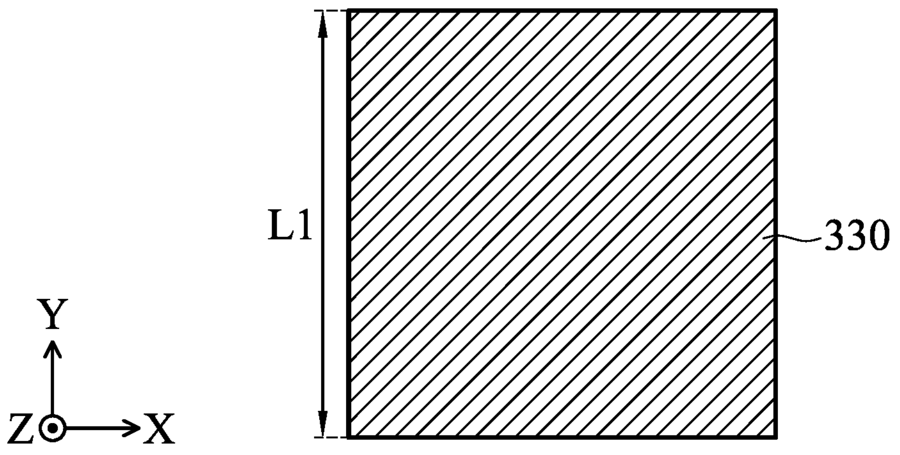
FIG. 3A is a top view of a floating metal element according to an embodiment of the invention.

FIG. 3A is a top view of a floating metal element 330 according to an embodiment of the invention. In the embodiment of FIG. 3A, the floating metal element 330 may substantially have a square shape, and the side length L1 of the square shape is from 0.1 to 0.5 wavelength (λ/10~λ/2) of the operational frequency band FB1 of the antenna system 100. For example, the side length L1 may be about 9 mm, but it is not limited thereto.

Figure 3B:
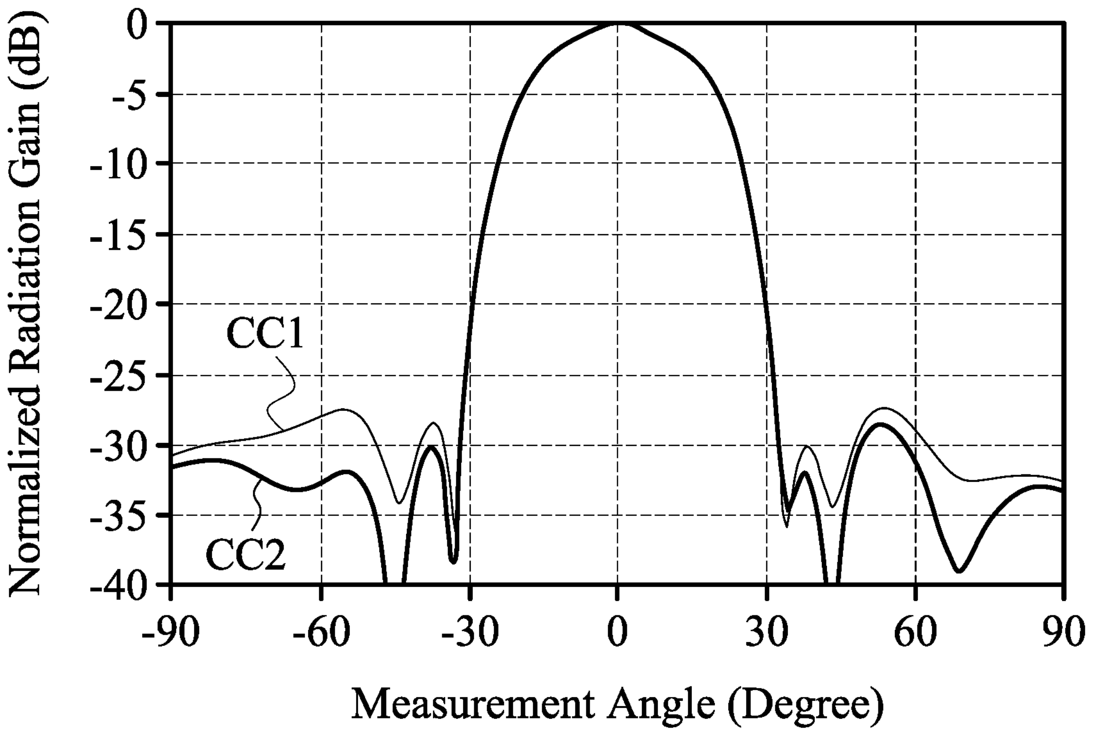
FIG. 3B is a radiation pattern of an antenna system using a floating metal element according to an embodiment of the invention.

FIG. 3B is a radiation pattern of the antenna system 100 using the floating metal element 330 according to an embodiment of the invention (it may be measured along the XZ-plane). The horizontal axis represents the measurement angle (degree), and the vertical axis represents the normalized radiation gain (dB). As shown in FIG. 3B, a first curve CC1 represents the operational characteristics of the antenna system 100 without the floating metal element 330, and a second curve CC2 represents the operational characteristics of the antenna system 100 with the floating metal element 330. According to the measurement of FIG. 3B, the square floating metal element 330 can help to reduce the side lobe radiation of the antenna system 100 by about 4.4 dB, thereby significantly improving the spatial efficiency of the antenna system 100.

Figure 4A:
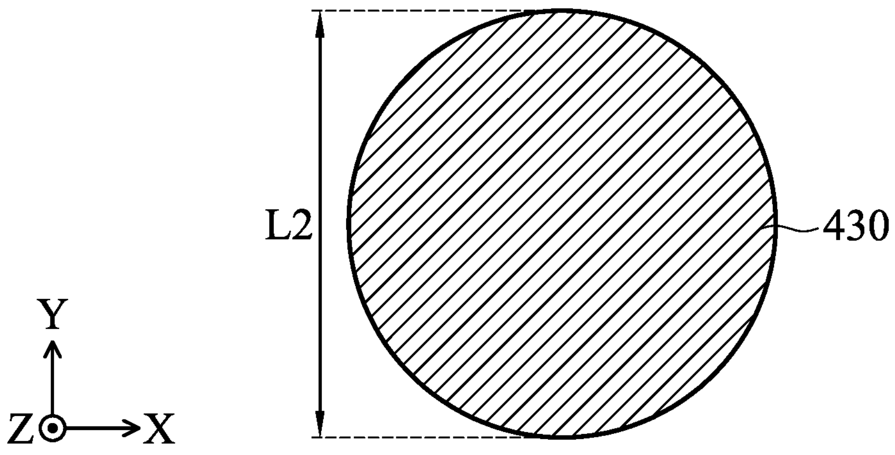
FIG. 4A is a top view of a floating metal element according to an embodiment of the invention.

FIG. 4A is a top view of a floating metal element 430 according to an embodiment of the invention. In the embodiment of FIG. 4A, the floating metal element 430 may substantially have a circular shape, and the diameter L2 of the circular shape is from 0.1 to 0.5 wavelength (λ/10~λ/2) of the operational frequency band FB1 of the antenna system 100. For example, the diameter L2 may be about 10 mm, but it is not limited thereto.

Figure 4B:
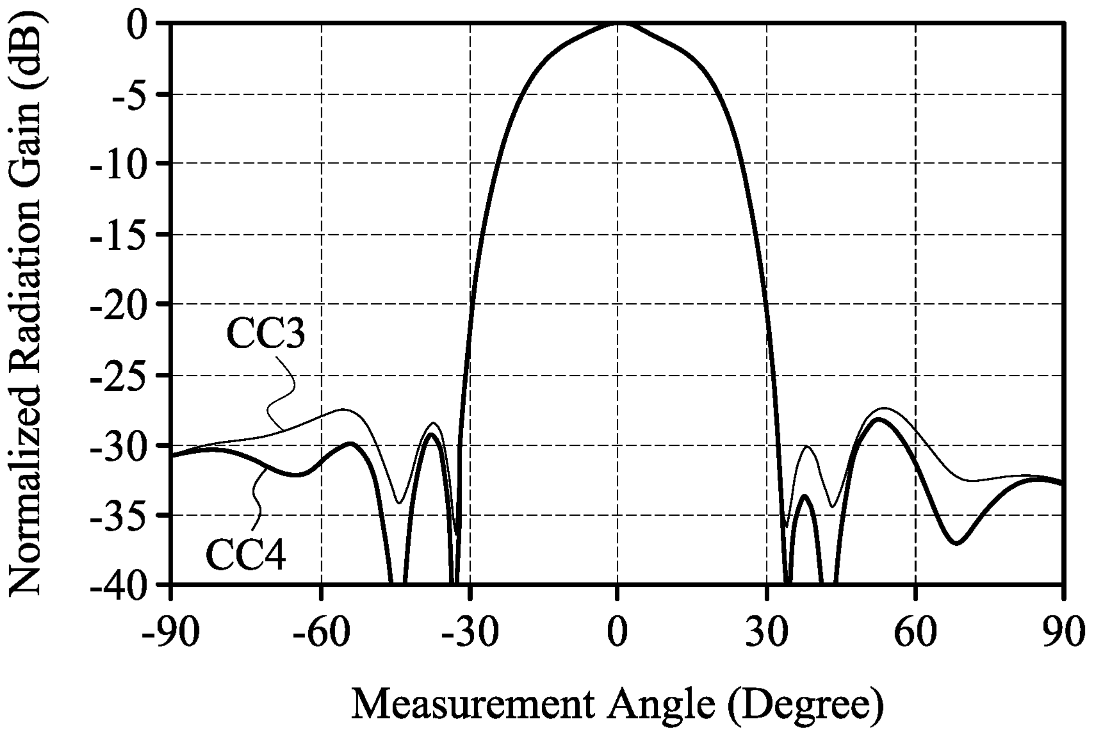
FIG. 4B is a radiation pattern of an antenna system using a floating metal element according to an embodiment of the invention.

FIG. 4B is a radiation pattern of the antenna system 100 using the floating metal element 430 according to an embodiment of the invention (it may be measured along the XZ-plane). The horizontal axis represents the measurement angle (degree), and the vertical axis represents the normalized radiation gain (dB). As shown in FIG. 4B, a third curve CC3 represents the operational characteristics of the antenna system 100 without the floating metal element 430, and a fourth curve CC4 represents the operational characteristics of the antenna system 100 with the floating metal element 430. According to the measurement of FIG. 4B, the circular floating metal element 430 can help to reduce the side lobe radiation of the antenna system 100 by about 3.5 dB, thereby significantly improving the spatial efficiency of the antenna system 100.

Figure 5A:
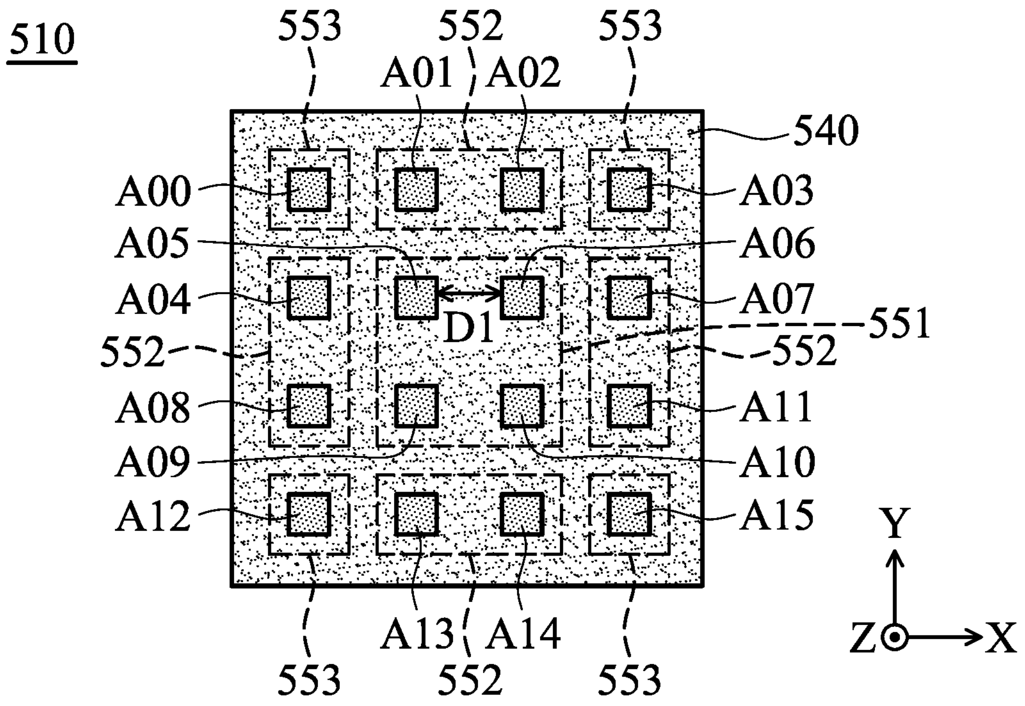
FIG. 5A is a top view of an antenna array according to an embodiment of the invention.

FIG. 5A is a top view of an antenna array 510 according to an embodiment of the invention. In the embodiment of FIG. 5A, the antenna array 510 is a 4×4 patch antenna array that includes a plurality of antenna units A00, A01, . . . , and A15 and a ground plane layer 540. The ground plane layer 540 is made of a metal material, and it is adjacent to the antenna units A00, A01, . . . , and A15. In addition, the distance D1 between any adjacent two of the antenna units A00, A01, . . . , and A15 may be from 0.2 to 0.8 wavelength (0.2λ-0.8λ) of the operational frequency band FB1 of the antenna array 510. In some embodiments, the antenna units A00, A01, . . . , and A15 are divided into a central group 551, an edge group 552, and a corner group 553. Specifically, the central group 551 including 4 antenna units A05, A06, A09 and A10 may correspond to relatively large RF (Radio Frequency) power. The edge group 552 including 8 antenna units A01, A02, A04, A07, A08, A11, A13 and A14 may correspond to relatively median RF power. The corner group 553 including 4 antenna units A00, A03, A12 and A15 may correspond to relatively small RF power. According to practical measurements, if the antenna array 510 use unequal RF power for signal transmission and reception, the side lobe radiation of the antenna array 510 can be further suppressed. In alternative embodiments, the antenna array 510 is used independently, and it is not used together with the aforementioned floating metal element.

In some embodiments, the relative power distribution of the antenna array 510 are described in the following table, Table I (0<X<1 and 0<Y<1):

TABLE I

| Relative Power Distribution of Antenna Array 510 | | | |
|---|---|---|---|
| A00 (X · Y) | A01 (Y) | A02 (Y) | A03 (X · Y) |
| A04 (X) | A05 (1) | A06 (1) | A07 (X) |
| A08 (X) | A09 (1) | A10 (1) | A11 (X) |
| A12 (X · Y) | A13 (Y) | A14 (Y) | A15 (X · Y) |

("X · Y" means the product of X and Y)

Figure 5B:
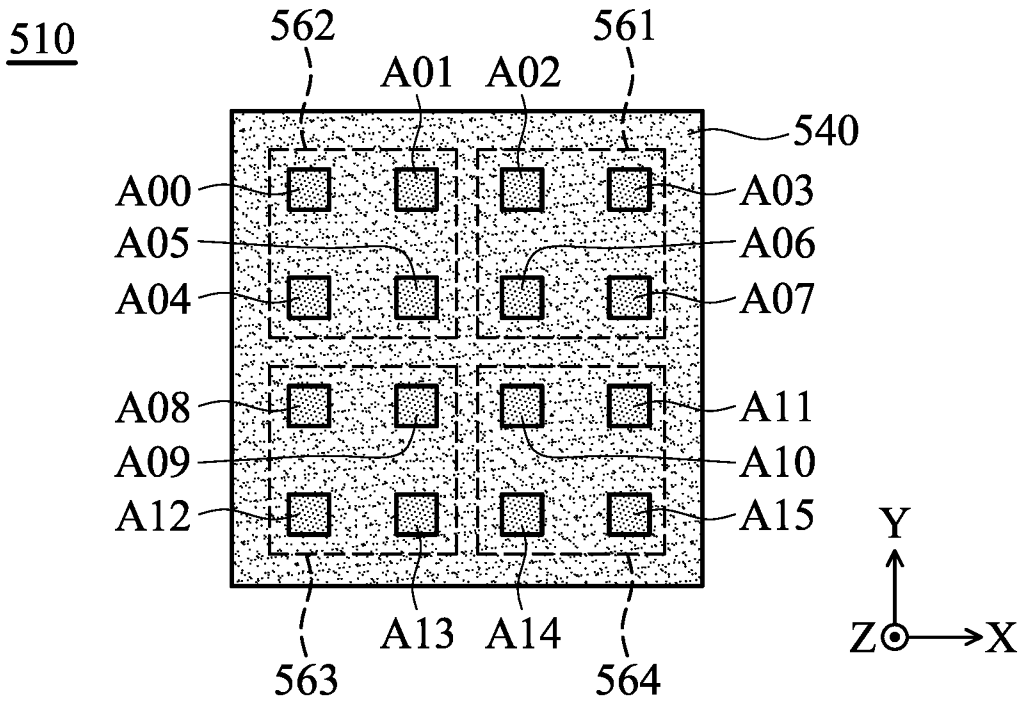
FIG. 5B is a top view of an antenna array according to an embodiment of the invention.

FIG. 5B is a top view of the antenna array 510 according to an embodiment of the invention. In the embodiment of FIG. 5B, the antenna array 510 supports RHCP (Right-Hand Circular Polarization), and the antenna units A00, A01, . . . , and A15 are divided into a first group 561, a second group 562, a third group 563, and a fourth group 564. Specifically, the first group 561 including 4 antenna units A02, A03, A06 and A07 may correspond to the original feeding phase (e.g., 0 degrees). The second group 562 including 4 antenna units A00, A01, A04 and A05 may correspond to a first delay feeding phase (e.g., −90 degrees). The third group 563 including 4 antenna units A08, A09, A12 and A13 may correspond to a second delay feeding phase (e.g., −180 degrees). The fourth group 564 including 4 antenna units A10, A11, A14 and A15 may correspond to a third delay feeding phase (e.g., −270 degrees).

In some embodiments, the relative feeding phases of the antenna array 510 supporting RHCP are described in the following table, Table II (0°≤A<360° and 0°≤B<360°):

TABLE II

| Relative Feeding Phases of Antenna Array 510 (RHCP) | | | |
|---|---|---|---|
| A00 | A01 | A02 | A03 |
| (A + B − 90°) | (B − 90°) | (B) | (A + B) |
| A04 | A05 | A06 | A07 |
| (A − 90°) | (−90°) | (0°) | (A) |
| A08 | A09 | A10 | A11 |
| (A − 180°) | (−180°) | (−270°) | (A − 270°) |
| A12 | A13 | A14 | A15 |
| (A + B − 180°) | (B − 180°) | (B − 270°) | (A + B − 270°) |

Figure 5C:
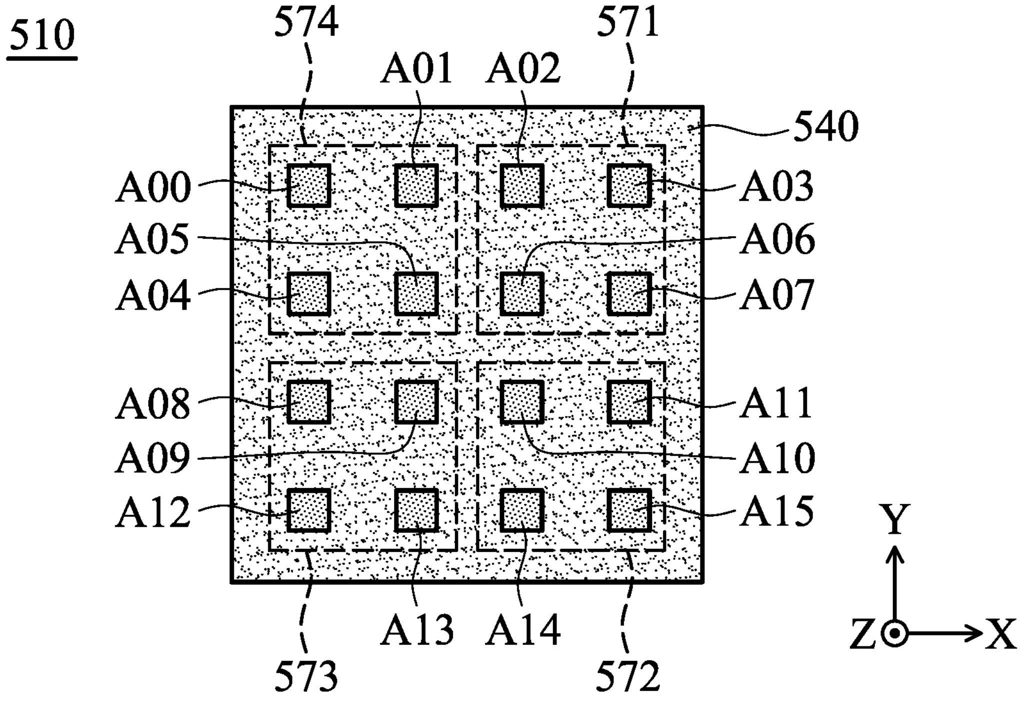
FIG. 5C is a top view of an antenna array according to an embodiment of the invention.

FIG. 5C is a top view of the antenna array 510 according to an embodiment of the invention. In the embodiment of FIG. 5C, the antenna array 510 supports LHCP (Left-Hand Circular Polarization), and the antenna units A00, A01, . . . , and A15 are divided into a first group 571, a second group 572, a third group 573, and a fourth group 574. Specifically, the first group 571 including 4 antenna units A02, A03, A06 and A07 may correspond to the original feeding phase (e.g., 0 degrees). The second group 572 including 4 antenna units A10, A11, A14 and A15 may correspond to a first delay feeding phase (e.g., −90 degrees). The third group 573 including 4 antenna units A08, A09, A12 and A13 may correspond to a second delay feeding phase (e.g., −180 degrees). The fourth group 574 including 4 antenna units A00, A01, A04 and A05 may correspond to a third delay feeding phase (e.g., −270 degrees).

In some embodiments, the relative feeding phases of the antenna array 510 supporting LHCP are described in the following table, Table III (0°≤A<360° and 0°≤B<360°):

TABLE III

| Relative Feeding Phases of Antenna Array 510 (LHCP) | | | |
|---|---|---|---|
| A00 | A01 | A02 | A03 |
| (A + B − 270°) | (B − 270°) | (B) | (A + B) |
| A04 | A05 | A06 | A07 |
| (A − 270°) | (−270°) | (0°) | (A) |
| A08 | A09 | A10 | A11 |
| (A − 180°) | (−180°) | (−90°) | (A − 90°) |
| A12 | A13 | A14 | A15 |
| (A + B − 180°) | (B − 180°) | (B − 90°) | (A + B − 90°) |

Figure 6A:
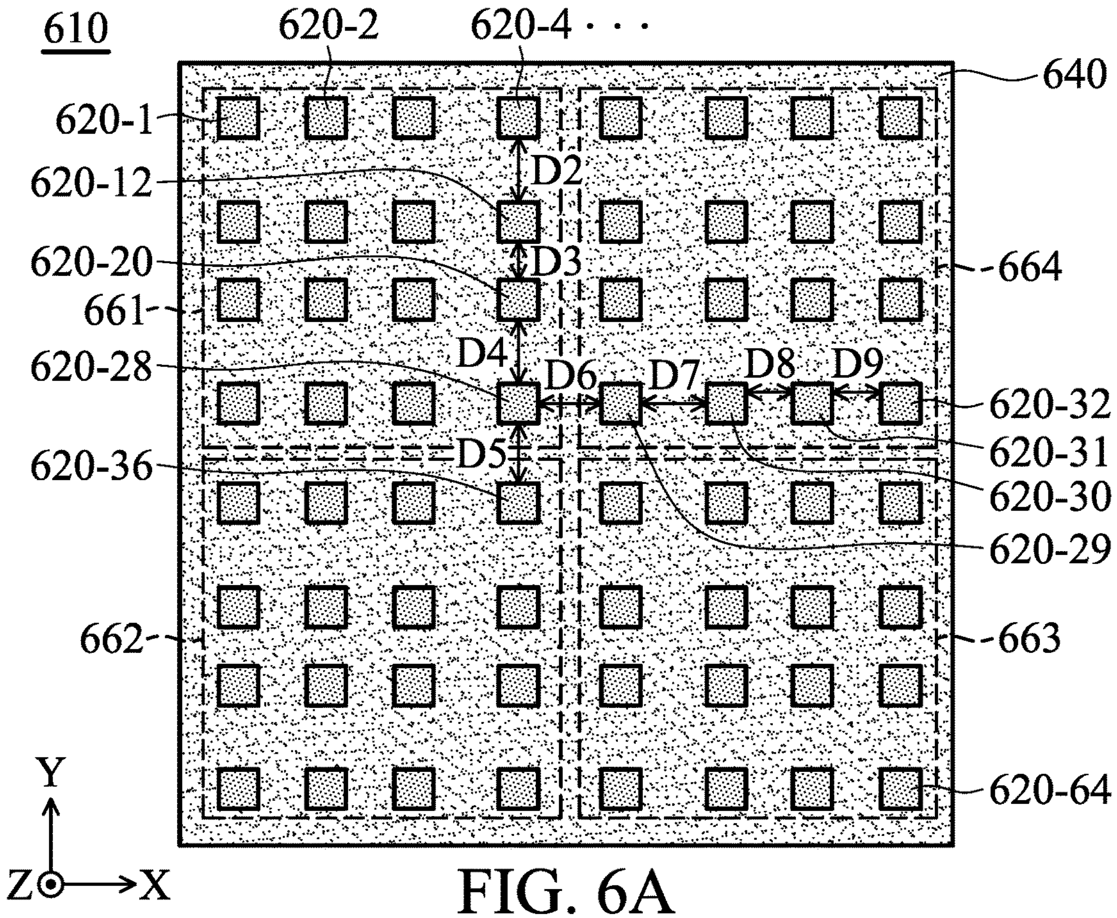
FIG. 6A is a top view of an antenna array according to an embodiment of the invention.

FIG. 6A is a top view of an antenna array 610 according to an embodiment of the invention. In the embodiment of FIG. 6A, the antenna array 610 is a 8×8 patch antenna array that includes a plurality of antenna units 620-1, 620-2, . . . , and 620-64 and a ground plane layer 640. To fine-tune the radiation pattern, any adjacent two of the antenna units 620-1, 620-2, . . . , and 620-64 may have slightly different distances therebetween. For example, the distance D2 between the antenna units 620-12 and 620-4 may be substantially equal to wavelength (0.64λ) of the operational frequency band FB1 of the antenna array 610. The distance D3 between the antenna units 620-20 and 620-12 may be substantially equal to wavelength (0.49λ) of the operational frequency band FB1 of the antenna array 610. The distance D4 between the antenna units 620-28 and 620-20 may be substantially equal to wavelength (0.64λ) of the operational frequency band FB1 of the antenna array 610. The distance D5 between the antenna units 620-36 and 620-28 may be substantially equal to wavelength (0.62λ) of the operational frequency band FB1 of the antenna array 610. The distance D6 between the antenna units 620-29 and 620-28 may be substantially equal to wavelength (0.64λ) of the operational frequency band FB1 of the antenna array 610. The distance D7 between the antenna units 620-30 and 620-29 may be substantially equal to wavelength (0.65λ) of the operational frequency band FB1 of the antenna array 610. The distance D8 between the antenna units 620-31 and 620-30 may be substantially equal to wavelength (0.54λ) of the operational frequency band FB1 of the antenna array 610. The distance D9 between the antenna units 620-32 and 620-31 may be substantially equal to wavelength (0.54λ) of the operational frequency band FB1 of the antenna array 610. However, the invention is not limited thereto. In alternative embodiments, the aforementioned distances are adjustable according to different requirements.

Figure 6B:
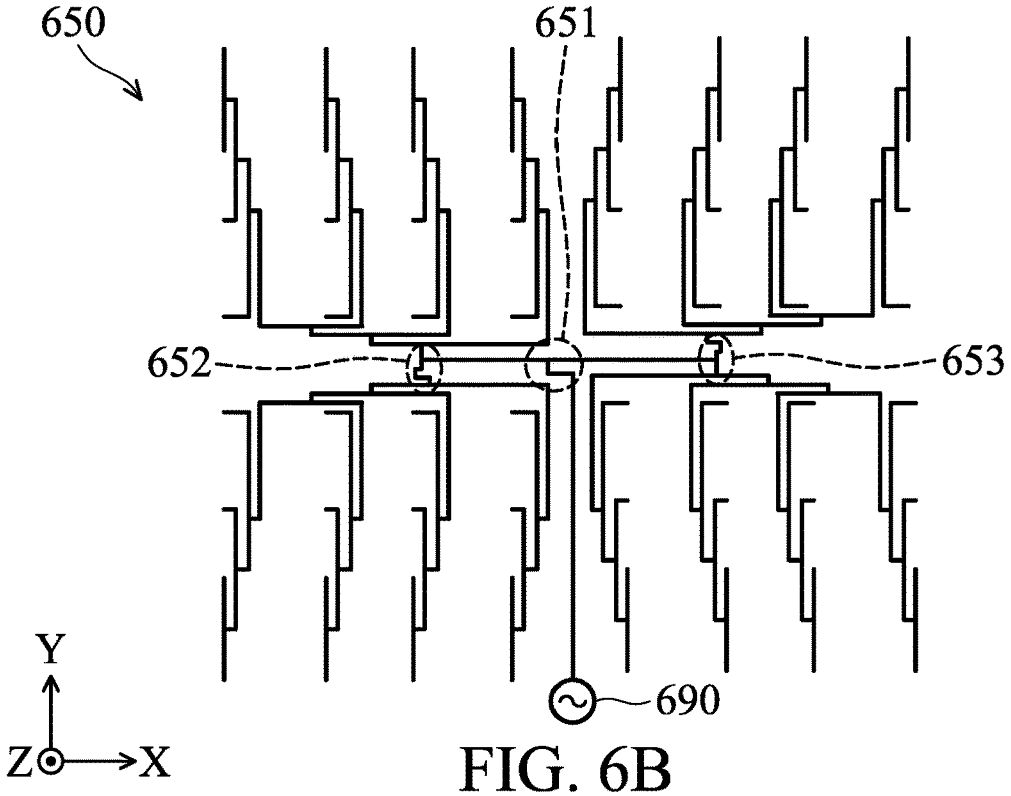
FIG. 6B is a top view of a feeding branch layer according to an embodiment of the invention.

FIG. 6B is a top view of a feeding branch layer 650 according to an embodiment of the invention. In the embodiment of FIG. 6B, the aforementioned antenna array 610 further includes the feeding branch layer 650. The feeding branch layer 650 is coupled to a single signal source 690. The antenna units 620-1, 620-2, . . . , and 620-64 are excited by the feeding branch layer 650. For example, the ground plane layer 640 may be disposed between the antenna units 620-1, 620-2, . . . , and 620-64 and the feeding branch layer 650. The feeding branch layer 650 may extend through a plurality of via holes (not shown) of the ground plane layer 640, and may be respectively coupled to the antenna units 620-1, 620-2, . . . , and 620-64. With such a design of the feeding branch layer 650, the antenna array 610 can use the single signal source 690 for signal transmission and reception, and its whole size can be significantly reduced. In some embodiments, the feeding branch layer 650 includes a first branch tuning segment 651, a second branch tuning segment 652, and a third branch tuning segment 653, so as to provide the functions of power distribution and feeding phase adjustment.

In some embodiments, the first branch tuning segment 651 provides an equal power split and a 180° feeding phase difference therebetween, and each of the second branch tuning segment 652 and the third branch tuning segment 653 provides an equal power split and a 90° feeding phase difference therebetween. In the above embodiments, the antenna units 620-1, 620-2, . . . , and 620-64 of the antenna array 610 are divided into a first group 661, a second group 662, a third group 663, and a fourth group 664. The first group 661 may correspond to the original feeding phase (e.g., 0 degrees). The second group 662 may correspond to a first delay feeding phase (e.g., −90 degrees). The third group 663 may correspond to a second delay feeding phase (e.g., −180 degrees). The fourth group 664 may correspond to a third delay feeding phase (e.g., −270 degrees).

In alternative embodiments, if a P×Q antenna array is used, it may correspond P×Q−4 branch tuning segments, where each of P and Q is a positive integer. For example, an 8×8 antenna array may correspond to 60 branch tuning segments, and a 10×8 antenna array may correspond to 76 branch tuning segments, but they are not limited thereto. Furthermore, the structures of these branch tuning segments are described in detail in the following embodiments.

Figure 7A:
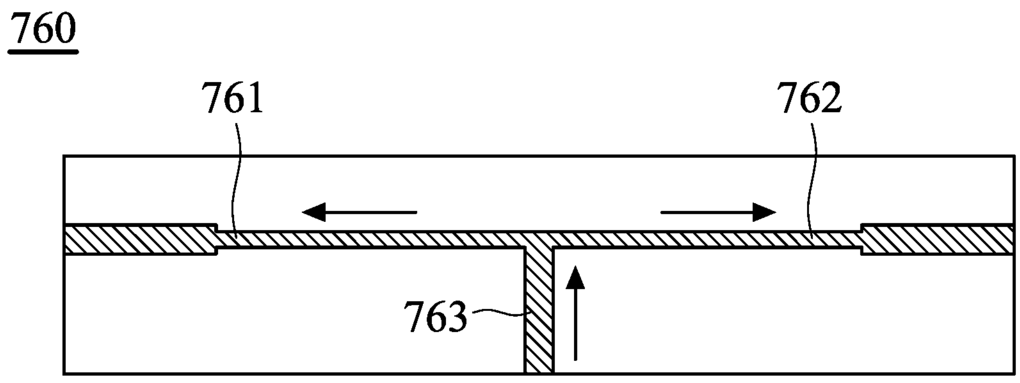
FIG. 7A is a top view of a branch tuning segment according to an embodiment of the invention.

FIG. 7A is a top view of a branch tuning segment 760 according to an embodiment of the invention. In the embodiment of FIG. 7A, the branch tuning segment 760 includes a first branch 761, a second branch 762, and a common branch 763. The width of the second branch 762 is equal to the width of the first branch 761. When the common branch 763 is fed in, the first branch 761 and the second branch 762 can provide the same output power.

Figure 7B:
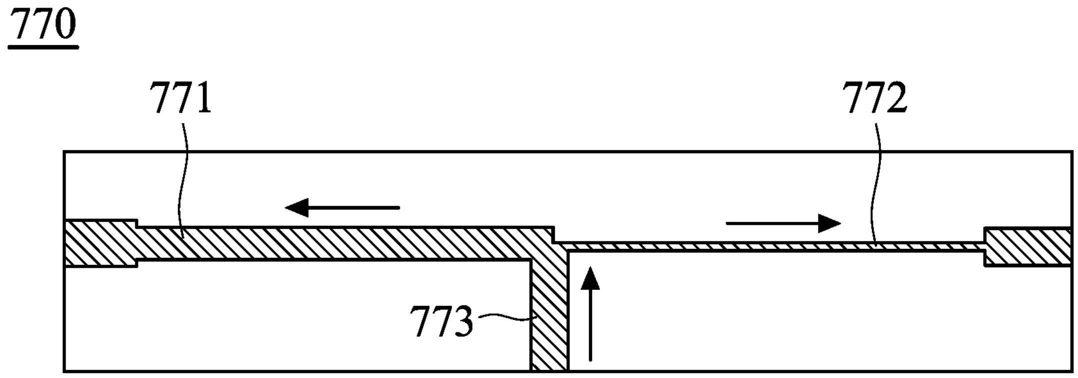
FIG. 7B is a top view of a branch tuning segment according to an embodiment of the invention.

FIG. 7B is a top view of a branch tuning segment 770 according to an embodiment of the invention. In the embodiment of FIG. 7B, the branch tuning segment 770 includes a first branch 771, a second branch 772, and a common branch 773. The width of the second branch 772 is smaller than the width of the first branch 771. When the common branch 773 is fed in, the first branch 771 and the second branch 772 can provide different output power. In some embodiments, each of the first branch 771 and the second branch 772 of the branch tuning segment 770 uses an impedance transformer to fine-tune its impedance matching.

Figure 8A:
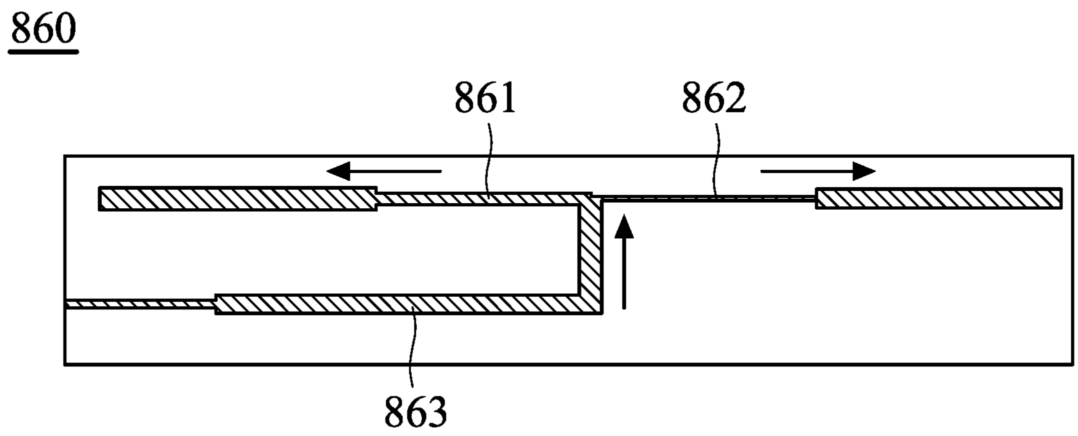
FIG. 8A is a top view of a branch tuning segment according to an embodiment of the invention.

FIG. 8A is a top view of a branch tuning segment 860 according to an embodiment of the invention. In the embodiment of FIG. 8A, the branch tuning segment 860 includes a first branch 861, a second branch 862, and a common branch 863. The length of the second branch 862 is equal to the length of the first branch 861. When the common branch 863 is fed in, the first branch 861 and the second branch 862 can provide the same feeding phase.

Figure 8B:
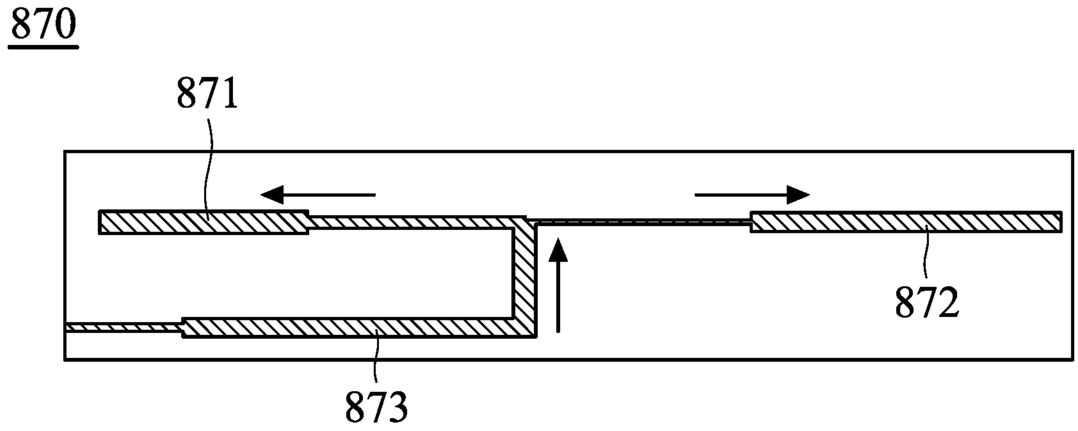
FIG. 8B is a top view of a branch tuning segment according to an embodiment of the invention.

FIG. 8B is a top view of a branch tuning segment 870 according to an embodiment of the invention. In the embodiment of FIG. 8B, the branch tuning segment 870 includes a first branch 871, a second branch 872, and a common branch 873. The length of the second branch 872 is longer than the length of the first branch 871. When the common branch 873 is fed in, the first branch 871 and the second branch 872 can provide different feeding phases.

Figure 9:
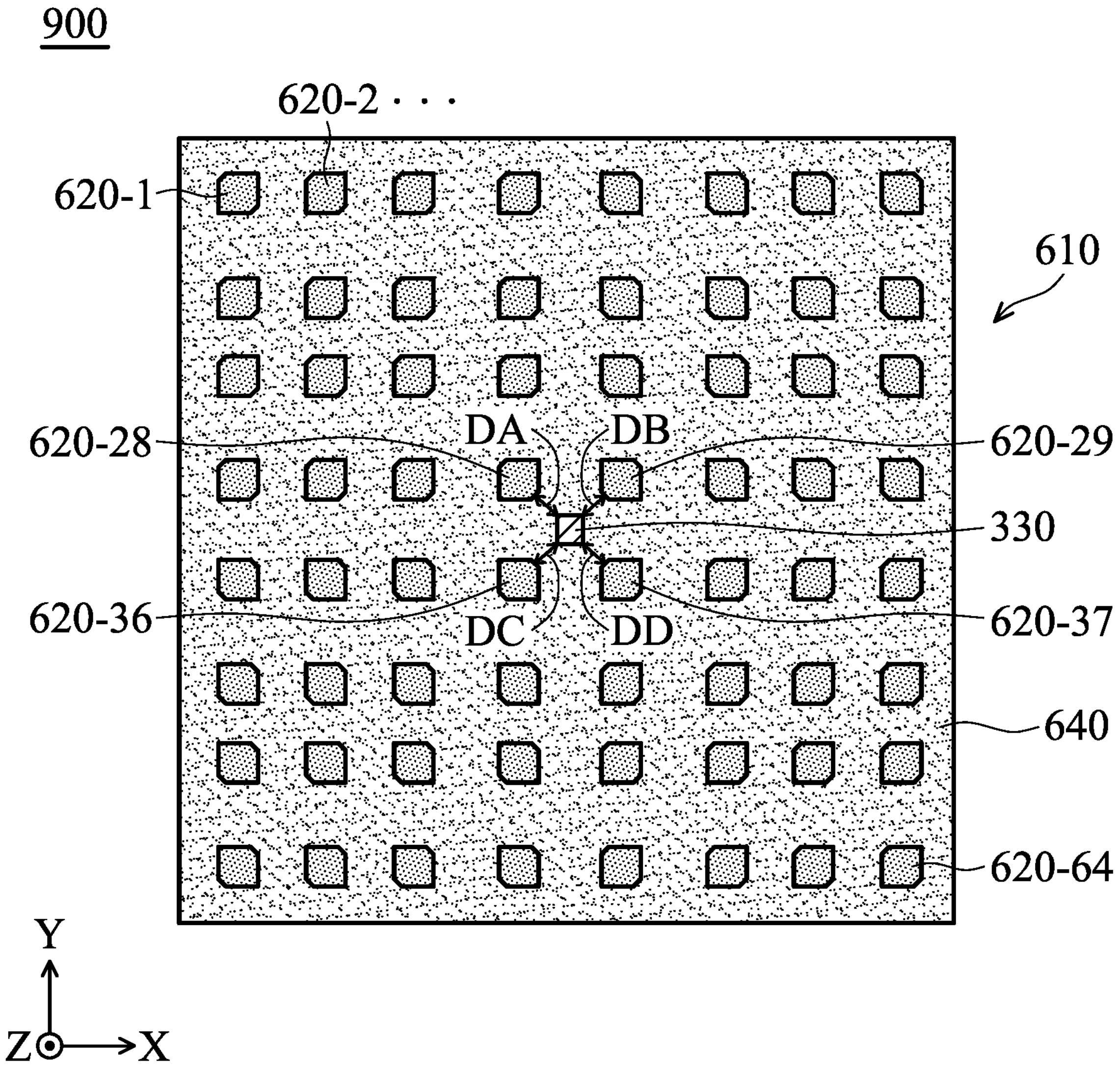
FIG. 9 is a top view of an antenna system according to an embodiment of the invention.

FIG. 9 is a top view of an antenna system 900 according to an embodiment of the invention. In the embodiment of FIG. 9, the antenna system 900 includes the floating metal element 330 of FIG. 3 and the antenna array 610 of FIG. 6, but the shapes of the antenna units 620-1, 620-2, . . . , and 620-64 are slightly adjusted. For example, each of the antenna units 620-1, 620-2, . . . , and 620-64 may substantially have a hexagonal shape, so as to enhance the circularly-polarized characteristics of the antenna array 610. The floating metal element 330 is adjacent to the center of the antenna array 610. Specifically, the floating metal element 330 is disposed between the antenna units 620-28, 620-29, 620-36 and 620-37 of the antenna array 610. For example, the distance DA between the floating metal element 330 and the antenna unit 620-28 may be shorter than or equal to 1 wavelength (1λ) of the operational frequency band FB1 of the antenna array 610. The distance DB between the floating metal element 330 and the antenna unit 620-29 may be shorter than or equal to 1 wavelength (1λ) of the operational frequency band FB1 of the antenna array 610. The distance DC between the floating metal element 330 and the antenna unit 620-36 may be shorter than or equal to 1 wavelength (1λ) of the operational frequency band FB1 of the antenna array 610. The distance DD between the floating metal element 330 and the antenna unit 620-37 may be shorter than or equal to 1 wavelength (1λ) of the operational frequency band FB1 of the antenna array 610. In some embodiments, the aforementioned distances DA, DB, DC and DD are substantially equal to each other. The above ranges of element sizes are calculated and obtained according to many experiment results, and they help to optimize the side lobe suppression ratio of the antenna system 900. In alternative embodiments, the antenna system 900 further includes the aforementioned feeding branch layer 650, so as to provide the functions of power distribution and feeding phase adjustment.

It should be understood that the sizes of the above antenna arrays are merely exemplary. As a matter of fact, the sizes of these antenna arrays are adjustable according to different requirements. For example, they may be modified to 5×5, 6×6, 7×7, 9×9, or 10×10 antenna arrays but not limited thereto.

The invention proposes a novel antenna system and a novel antenna array. In comparison to the conventional design, the invention has at least the advantages of suppressing side lobes and increasing tolerance margins. Therefore, the invention is suitable for application in a variety of communication devices. In addition, if the invention is applied to the high-way ETC system, it can prevent two-side noise from degrading the whole communication quality.

Note that the above element sizes, element shapes, and frequency ranges are not limitations of the invention. An antenna designer can fine-tune these settings or values according to different requirements. It should be understood that the antenna system and antenna array of the invention are not limited to the configurations of FIGS. 1-9. The invention may merely include any one or more features of any one or more embodiments of FIGS. 1-9. In other words, not all of the features displayed in the figures should be implemented in the antenna system and antenna array of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:

an antenna array, comprising a plurality of antenna units; and a floating metal element, disposed adjacent to the antenna array, wherein a coupling distance is formed between the floating metal element and the antenna array;

wherein the floating metal element is configured to suppress side lobe radiation of the antenna array;

wherein the antenna array covers an operational frequency band;

wherein the coupling distance is shorter than or equal to 0.5 wavelength of the operational frequency band;

wherein the floating metal element substantially has a square shape or a circular shape.

2. The antenna system as claimed in claim 1, wherein the operational frequency band is from 5795 MHz to 5845 MHz.

3. The antenna system as claimed in claim 2, wherein a side length of the square shape is from 0.1 to 0.5 wavelength of the operational frequency band.

4. The antenna system as claimed in claim 2, wherein a diameter of the circular shape is from 0.1 to 0.5 wavelength of the operational frequency band.

5. The antenna system as claimed in claim 2, wherein a distance between any two adjacent antenna units is from 0.2 to 0.8 wavelength of the operational frequency band.

6. The antenna system as claimed in claim 1, wherein the antenna units are divided into a central group, an edge group, and a corner group, and wherein the central group corresponds to relatively large RF (Radio Frequency) power, the edge group corresponds to relatively median RF power, and the corner group corresponds to relatively small RF power.

7. The antenna system as claimed in claim 1, wherein the antenna units are divided into a first group, a second group, a third group, and a fourth group, and wherein the first group corresponds to an original feeding phase, the second group corresponds to a first delay feeding phase, the third group corresponds to a second delay feeding phase, and the fourth group corresponds to a third delay feeding phase.

8. The antenna system as claimed in claim 1, wherein the floating metal element is adjacent to a center of the antenna array.

9. The antenna system as claimed in claim 1, wherein the antenna array further comprises:

a ground plane layer, disposed adjacent to the antenna units; and a feeding branch layer, coupled to a single signal source, wherein the antenna units are excited by the feeding branch layer.

10. The antenna system as claimed in claim 9, wherein the feeding branch layer has functions of power distribution and feeding phase adjustment.

11. The antenna system as claimed in claim 1, wherein the antenna array is an 8×8 antenna array.

12. An antenna array, comprising:

a plurality of antenna units;

wherein the antenna units are divided into a central group, an edge group, and a corner group, and wherein the central group corresponds to relatively large RF (Radio Frequency) power, the edge group corresponds to relatively median RF power, and the corner group corresponds to relatively small RF power.

13. The antenna array as claimed in claim 12, wherein the antenna array covers an operational frequency band from 5795 MHz to 5845 MHz.

14. The antenna array as claimed in claim 13, wherein a distance between any two adjacent antenna units is from 0.2 to 0.8 wavelength of the operational frequency band.

15. The antenna array as claimed in claim 12, wherein the antenna units are divided into a first group, a second group, a third group, and a fourth group, and wherein the first group corresponds to an original feeding phase, the second group corresponds to a first delay feeding phase, the third group corresponds to a second delay feeding phase, and the fourth group corresponds to a third delay feeding phase.

16. The antenna array as claimed in claim 12, further comprising:

a ground plane layer, disposed adjacent to the antenna units; and a feeding branch layer, coupled to a single signal source, wherein the antenna units are excited by the feeding branch layer.

17. The antenna array as claimed in claim 16, wherein the feeding branch layer has functions of power distribution and feeding phase adjustment.

18. The antenna array as claimed in claim 1, wherein the floating metal element is adjacent to a center of the antenna array.

* * * * *